United States Patent [19]

Takeuchi

[11] 3,917,355
[45] Nov. 4, 1975

[54] FLUID PRESSURE CONTROL DEVICE WITH A FAILURE ALARM FOR A VEHICLE BRAKE SYSTEM

[75] Inventor: Hiroo Takeuchi, Ueda, Japan

[73] Assignee: Nisshin Kogyo Kabushiki Kaisha, Ueda, Japan

[22] Filed: Feb. 19, 1975

[21] Appl. No.: 551,152

[30] Foreign Application Priority Data
Apr. 17, 1974  Japan................................ 49-42879

[52] U.S. Cl. ................................ 303/6 C; 303/84 A
[51] Int. Cl.[2] ..................... B60T 11/34; B60T 17/22
[58] Field of Search ............. 188/349; 303/6 C, 6 R, 303/84 A, 84 R

[56] References Cited
UNITED STATES PATENTS
| | | | |
|---|---|---|---|
| 3,672,732 | 1/1972 | Green | 303/84 A |
| 3,841,711 | 10/1974 | Stelzer | 303/6 C |

*Primary Examiner*—Duane A. Reger
*Attorney, Agent, or Firm*—Waters, Schwartz & Nissen

[57] ABSTRACT

A device particularly designed to control the level of brake fluid pressure at the rear wheels relative to that at the front wheels so as to enable the brake system to operate with maximized efficiency despite of the forward tilt of the vehicle when braked. It includes, among others, a pair of pressure-reducing control valves inserted in the respective hydraulic fluid lines connected to the rear wheel brakes, a balance piston arranged across the fluid lines downstream of the control valves, and an alarm device associated with the balance piston. The balance piston is movable under a pressure differential, as occurring in the event of a fluid leak in either fluid line, to operate the associated alarm to warn the driver of such fluid failure without delay while enabling the full level of fluid pressure in the other, normal fluid line to reach the rear wheel, bypassing the control valve in the fluid line. If, when the brake pedal is released, one or the other of the control valves fail to restore its normal state to relieve the associated rear wheel brake of the hydraulic pressure previously applied, the balance piston is moved under such pressure again to produce an alarm signal and the brake fluid pressure is effectively released.

1 Claim, 5 Drawing Figures

FLUID PRESSURE CONTROL DEVICE WITH A FAILURE ALARM FOR A VEHICLE BRAKE SYSTEM

BACKGROUND OF THE INVENTION

This invention relates generally to brake systems for automotive vehicles of the type including a dual type brake master cylinder operable with two mutually independent hydraulic lines and more particularly to fluid pressure control devices for such brake systems and including a brake failure alarm.

As is well known, in one form of brake system of the type described, the first and second hydraulic lines extending from the respective outlet ports of the dual type brake master cylinder are connected to the brake cylinders in respective pairs of wheels, each including a front and a rear wheel located on the opposite sides of the vehicle. In another form, the front wheel brakes are each provided with two separate brake cylinders respectively connected with the first and second hydraulic lines.

SUMMARY OF THE INVENTION

The present invention has for its object the provision in such forms of brake system of a device which is highly effective to ensure driving safety, being capable of automatically adjusting the ratio of the front to the rear wheel brake fluid pressure to a definite value giving a high braking efficiency and further capable of alarming the driver of any failure in the device per se or of any fluid leakage in either of the first and second hydraulic lines.

The above and other objects and advantages of the present invention will become apparent from the following detailed description when taken in conjunction with the accompanying drawings.

DESCRIPTION OF THE PREFERRED EMBODIMENTS

Figure 1:
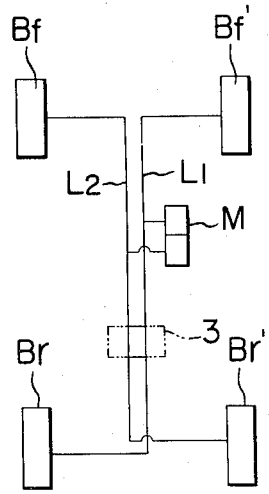
FIG. 1 is a schematic diagram illustrating the general arrangement of one preferred embodiment of the invention.
Figure 2:
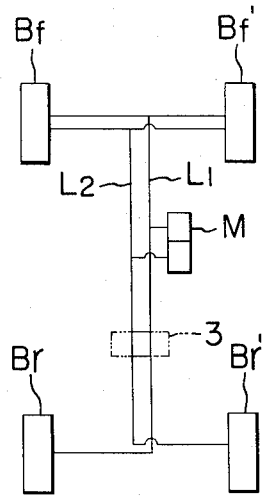
FIG. 2 is a diagram similar to FIG. 1 and illustrating the general arrangement of another preferred embodiment of the present invention.

In FIG. 1, there is shown a vehicle brake system which embodies the present invention and includes a first and a second hydraulic fluid line, $L_1$ and $L_2$, respectively, extending from the two output ports of a dual type brake master cylinder M and connected to the respective pairs of front and rear wheel brakes $B_f'$, $B_r$ and $B_f$, $B_r'$ located on the respective diagonal lines of the vehicle. FIG. 2 illustrates another brake system embodying the present invention and in which each of the front wheel brakes $B_f$ and $B_f'$ includes two separate fluid chambers respectively connected with first and second fluid lines $L_1$ and $L_2$. In each of these figures, reference numeral 3 indicates the casing of the device of the present invention, arranged on the first and second fluid lines $L_1$ and $L_2$ of the brake system between the brake master cylinder M and rear wheel brakes $B_r$ and $B_r'$.

Figure 3:
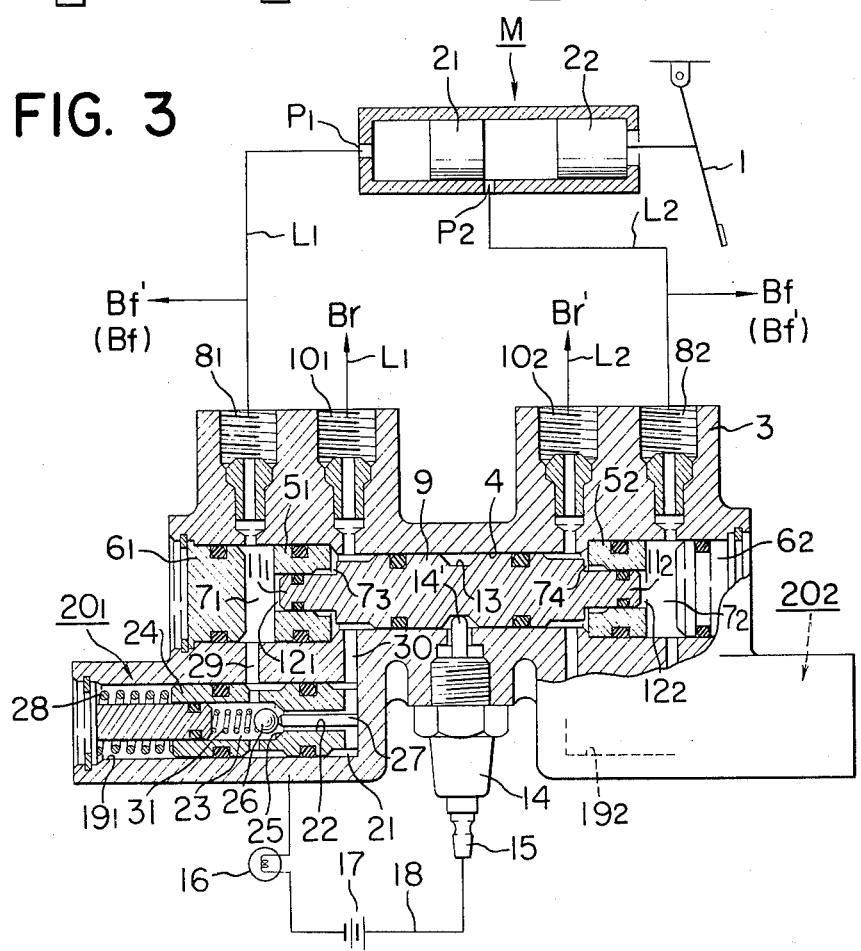
FIG. 3 is a partly schematic cross-sectional view of the essential part of the device shown in FIGS. 1 and 2.

Referring to FIG. 3, the dual type brake master cyliner M is of know tandem structure, including an integral piston assembly comprised of a pair of front and rear pistons $2_1$ and $2_2$, which are operable under the action of a brake pedal 1 to feed the first and second fluid lines $L_1$ and $L_2$ with pressure fluid such as oil under pressure, respectively, through a first and a second output port $P_1$ and $P_2$ formed in the master cylinder M.

The casing 3 has defined therein a stepped cylinder bore 4 having opposite end portions larger in diameter than the intermediate portion thereof. A first and a second pressure-receiving piston $5_1$ and $5_2$ are slidably fitted in the respective larger diameter portions with closure plugs $6_1$ and $6_2$ fixedly fitted in the respective outer ends thereof to define a first and a second fluid chambers $7_1$ and $7_2$, respectively, between the piston $5_1$ and closure plug $6_1$ and between the piston $5_2$ and closure plug $6_2$. The first fluid chamber $7_1$ is at all times in communication with the upstream portion of first fluid line $L_1$ though a first inlet port $8_1$ formed in the casing 3 while the second fluid chamber $7_2$ is at all times in communication with the upstream portion of second fluid line $L_2$ though a second inlet port $8_2$ formed in the casing 3.

A balance piston 9 is slidably fitted in the smaller diameter portion of cylinder bore 4, defining therein a third and a fourth fluid chambers $7_3$ and $7_4$ in cooperation with the first and second pressure-receiving pistons $5_1$ and $5_2$, respectively. The downstream portion of first fluid line $L_1$, extending to one of the rear wheel brakes, $B_r$ is connected with the third fluid chamber $7_3$ through a first outlet port $10_1$ formed in the casing 3 and the downstream portion of second fluid line $L_2$, extending to the other rear wheel brake $B_r'$, is connected with the fourth fluid chamber $7_4$ through a second outlet port $10_2$ formed in the casing 3.

The balance piston 9 has plug formations $11_1$ and $11_2$ on the opposite ends thereof, each of which takes the form of a reduced diameter stub extending axially outwardly from the piston end. On the other hand, the first and second pressure-receiving pistons $5_1$ and $5_2$ are formed therein with respective axial bypass holes $12_1$ and $12_1$ for fluid communication between the first and third fluid chambers $7_1$ and $7_3$ and between the second and fourth fluid chambers $7_2$ and $7_4$, respectively. The plug formations $11_1$ and $11_2$ are normally slidably fitted in the respective bypass holes $12_1$ and $12_2$, but each of which holes is opened when the associated first or second pressure-receiving piston $5_1$ or $5_2$ is axially moved relative to the balance piston 9 widely apart therefrom.

Also, the balance piston 9 is formed midway of its axial length with an annular groove 13 having tapered side walls and a switch unit 14 is threadably mounted on the adjacent part of casing 3 with its actuator $14'$ normally engaging with the annular groove 13. The switch unit 14 has incorporated therein normally open contacts closable when the switch actuator $14'$ is pushed out of the annular groove 13 by axial movement of the balance piston 9 to complete an electric circuit 18 including an alarm 16 such as a lamp or a buzzer and a voltage source 17 between the switch terminal 15 and the casing 3.

The casing 3 is further provided with a pair of right and left cylinder bores $19_1$ and $19_2$, both extending parallel to the cylinder bore 4, and a first and a second control valve $20_1$ and $20_2$ are arranged in the respective cylinder bores $19_1$ and $19_2$, as will be described below in detail, to serve the purpose of controlling the brake fluid pressure at the rear wheel brakes $B_r$ and $B_r'$.

The first control valve $20_1$ includes a control piston 24 slidably fitted in the cylinder bore $19_1$ to define a large diameter fluid chamber 21 on the front face of the piston. A small diameter fluid chamber 23 is formed in the piston and normally communicating with the large diameter fluid chamber 21 through an axial aperture 22 formed in the piston. The first control valve $20_1$ also includes a ball valve element 26 engageable with a valve seat 25 formed at the junction of the small diameter fluid chamber 23 with axial aperture 22, a valve-opening rod 27 secured to the adjacent end wall of the cylinder bore $19_1$ and extending through the axial aperture 22 to hold the ball valve element 26 in a fixed position so that the valve port or aperture 22 is normally held open with the control piston 24 advanced or moved rightward, as viewed in FIG. 3, to an extreme position, and a pressure-regulating spring 28 arranged normally to bias the control piston 24 in a forward or rightward direction. The small diameter fluid chamber 23 is in fluid communication with the first fluid chamber $7_1$ through a fluid passage hole 29 while the large diameter fluid chamber 21 is in fluid communication with the third fluid chamber $7_3$ through a fluid passage hole 30. Reference numeral 31 indicates a spring arranged to bias the ball valve 26 against the valve-opening rod 27. The second control valve $20_2$ is quite the same in construction as the first control valve $20_1$ and arranged in symmetrical relation thereto.

Description will next be made of the operation of the embodiment illustrated.

Figure 4:
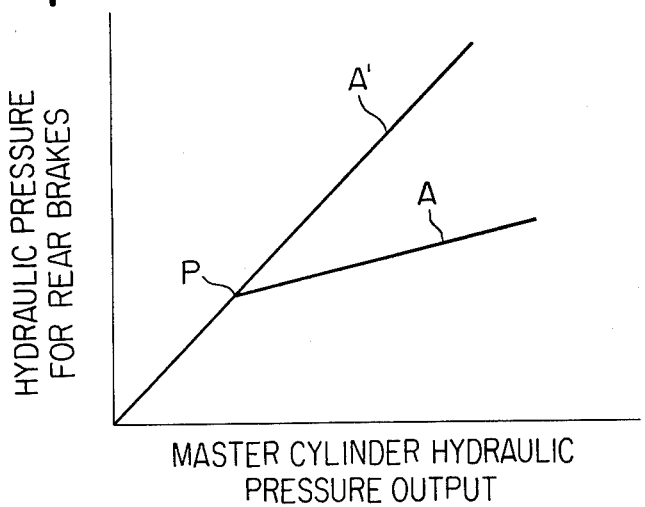
FIG. 4 is a graphic representation of the fluid pressure characteristics obtainable with rear wheel brakes according to the present invention.

When the brake pedal 1 is operated to actuate the brake master cylinder M, the output fluid pressure of the master cylinder M is transmitted through the first and second fluid lines $L_1$ and $L_2$ to the respective fluid chambers of the front wheel brakes $B_f$, $B_f'$ and rear wheel brakes $B_r$, $B_r'$, as long as there is no failure in the fluid systems, to actuate the front and rear wheel brakes. As the output fluid pressure of the master cylinder M is increased to raise the fluid pressure in the large diameter and small diameter fluid chambers 21, 23 in each of control valves $20_1$, $20_2$ above a predetermined level, the pressure differential between the two fluid chambers 21, 23 is increased to cause the control piston 24 to retract overcoming the set load of pressure-regulating spring 28 and the ball valve element 26 is placed in seating engagement with the valve seat 25 to close the valve port or aperture 22. Accordingly, the pressure of brake fluid in the rear wheel brakes $B_r$, $B_r'$ is reduced by an amount corresponding to the increase in volume of the large diameter fluid chamber 21 resulting from the retraction or leftward movement of the control piston 24. As the output fluid pressure of master cylinder M is further increased, the pressure in the small diameter fluid chamber 23 is increased so as to move the control piston 24 forward again to open the ball valve 26 thereby to increase the pressure in the large diameter fluid chamber 21 and, when this pressure reaches a definite level, the control piston 24 is again actuated to reduce the pressure in the fluid chamber 21. With repetition of the operation described, the brake fluid pressure in each of the rear wheel brakes $B_r$, $B_r'$ varies along the flexed line A in FIG. 4. The point of inflexion p is determined by the initial load of the pressure-regulating spring 28 and the rate of pressure increase after the point of inflexion p is reached is determined by the ratio of the effective cross-sectional areas of the two fluid chambers 21 and 23.

Figure 5:
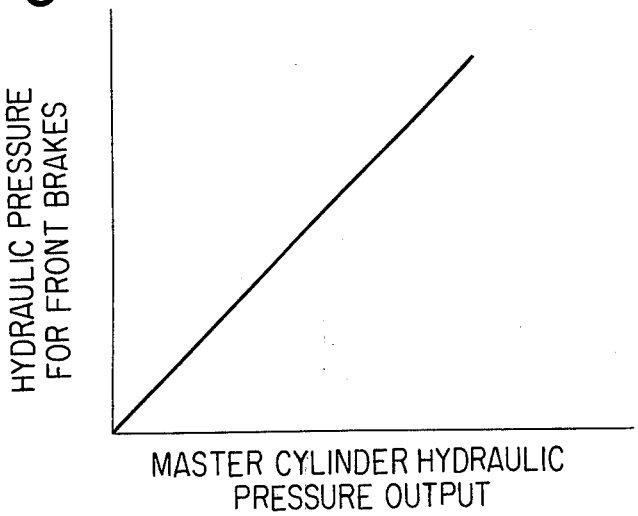
FIG. 5 illustrates the fluid pressure characteristic obtainable with front wheel brakes.

On the other hand, the brake fluid pressure in the front wheel brakes $B_f$ and $B_f'$ is not reduced in any manner during the operation, exhibiting a rectilinear characteristic, as illustrated in FIG. 5.

Accordingly, the front wheel brakes $B_f$, $B_f'$ can work forcefully upon the front wheels, which are subjected to an increased downward load when the vehicle is tilted forwardly under the effect of heavy braking operation, while the rear wheel brakes $B_r$, $B_r'$ work relatively lightly upon the rear wheels, which are more or less relieved of the load with the forward tilt of the vehicle. Thus, all the wheels of the vehicle can be braked highly efficiently without any danger of skidding.

Further, in the normal braking operation described above, since the pressures in the first and second fluid chambers $7_1$ and $7_2$ are held equal to each other and the pressures in the third and fourth fluid chambers $7_3$ and $7_4$ are also held equal to each other, the first and second pressure-receiving pistons $5_1$ and $5_2$ are driven to the extreme right and left positions, respectively, cooperating to hold the balance piston 9 in its neutral position, as illustrated, with the switch actuator 14' placed in engagement with the annular groove 13 formed around the periphery of the balance piston 9, and thus the switch unit 14 is held in its normal open state, rendering the alarm 16 inoperative.

Subsequently, at the instant when the brake pedal 1 is released to de-energize the master cylinder M, the front wheel brakes $B_f$ and $B_f'$ are disengaged while on the other hand the pressure in the small diameter fluid chamber 23 in each of the control valves $20_1$ and $20_2$ is rapidly reduced so that the ball valve 26 is pushed open against the bias of spring 31 under the effect of fluid pressure in the large diameter fluid chamber 21, allowing return flow of the pressure fluid from the large diameter fluid chamber 21 to the small diameter fluid chamber 23 to cause pressure reduction in the large diameter fluid chamber 21. As the result, the control piston 24 is advanced under the bias of pressure-regulating spring 28 to open the ball valve 26 with the aid of valve-opening rod 27 thereby to de-energize the associated rear wheel brake $B_r$ and $B_r'$.

In the event that the ball valve element 26 in one or the other of control valves $20_1$ and $20_2$ should remain stuck on the valve seat 25 for some reason or other and any return flow of pressure fluid from the large diameter fluid chamber 21 to the small diameter fluid chamber 23 be precluded even when the brake master cylinder M is de-energized, a pressure differential naturally occurring between the third and fourth fluid chambers $7_3$ and $7_4$ acts to drive the balance piston 9 to the lower pressure side thereof so that the switch actuator 14' is pushed out of the annular groove 13 along one of the tapered wall thereof to close the electric circuit 18 and hence the alarm 16 is operated to warn the driver of the brake failure. On this occasion, however, the axial sliding movement of balance piston 9 naturally causes increase in volume of the higher pressure fluid chamber $7_3$ or $7_4$ so that the pressure therein is immediately reduced to de-energize the rear wheel brake $B_r$ or $B_r'$, which is connected with the fluid chamber $7_3$ or $7_4$.

Description will next be made of the manner in which the brake system operates in the event of a fluid leakage occurring on one or the other of the first and second fluid lines $L_1$ and $L_2$.

Now, assuming a fluid leakage in the second fluid line $L_2$, when the brake master cylinder M is actuated, the pressure in the second and fourth fluid chambers $7_2$ and $7_4$ cannot be raised though the pressure in the first and third fluid chambers $7_1$ and $7_3$ is effectively raised. Under this situation, the balance piston 9, being subjected to the raised fluid pressure on its left end face, is moved to the right together with the second pressure-receiving piston $5_2$ until the latter is brought into abutting engagement with the adjacent closure plug $6_2$, when the switch actuator 14' is pushed out of the annular groove 13 formed around the balance piston 9 so that the electric circuit 18 is completed to operate the alarm 16. The balance piston 9, once placed in the extreme right position, remains in that position owing to the sliding resistance thereon, even after the brake master cylinder M has been released to exhaust the first and third fluid chambers $7_1$ and $7_3$, so that the alarm 16 can be kept in operation until the pressure failure or leakage in the second fluid line $L_2$ is remedied.

Also, as the balance piston 9 reaches its extreme right position as described above, the plug formation $11_1$ on the left end thereof slips out of the bypass hole $12_1$ and the first and second fluid chambers $7_1$ and $7_2$ are placed in fluid communication with each other through the bypass hole 12 thus opened so that the output fluid pressure of the master cylinder M is transmitted directly to the rear wheel brake $B_r$ through the first fluid chamber $7_1$ and bypass hole $12_1$, bypassing the first control valve $20_1$. The pressure of brake fluid in the rear wheel brake $B_r$ is thus increased as indicated by the straight line A' in FIG. 4 and the braking effect of the brake system as a whole is not reduced to any extreme extent despite of the failure of the other rear wheel brake $B_r'$ to operate.

In the event of a fluid leakage in the first fluid line $L_1$, the operation obtained is similar to that described above. Namely, an alarm is produced and the rear wheel brake $B_r'$ connected with the other, normally operating fluid line $L_1$ is fed with a fluid pressure not subjected to any pressure-reducing effect of the second control valve $20_2$.

It will be apparent from the foregoing description that, according to the present invention, the brake fluid pressure in each of the rear wheel brakes $B_r$ and $B_r'$ is normally reduced at a predetermined ratio with respect to the brake fluid pressure in the front wheel brakes $B_f$ and $B_f'$ so that all of the wheel brakes can operate with high efficiency irrespective of the change in load acting downwardly upon the front and rear wheels occurring upon braking operation as the vehicle is tilted forwardly. Further, not only in cases where a fluid leakage occurs in one or the other of the first and second fluid lines $L_1$ and $L_2$, respectively connected to the rear wheel brakes $B_r$ and $B_r'$, but also in cases where the fluid passage in one or the other of the first and second control valves $20_1$ and $20_2$, provided to controllably reduce the brake fluid pressure in the respective rear wheel brakes $B_r$ and $B_r'$, is blocked after braking operation, the alarm device 16 common to the two fluid systems is put into effect to warn the driver in operation of the existing failure without delay and its construction is characteristically simple. In addition, in the event of the former failure of fluid leakage in either fluid line, the rear wheel brake connected to the other fluid line, which is normal, is fed with fluid pressure not subjected to any pressure-reducing effect of the associated control valve $20_1$ or $20_2$ so that the braking effect of the brake system as a whole is not impaired to any material extent and a satisfactory driving safety is ensured. Also, in the event of the latter failure, any substantial fluid pressure is not allowed to remain in the rear wheel brake on the failure side and failure of the brake to restore its normal inoperative state is effectively avoided.

While one preferred form of the device of the present invention has been shown and described, it will be apparent to those skilled in the art that many changes and modifications may be made therein without departing from the spirit of the invention or the scope of the appended claims.

What is claimed is:

1. In a vehicle brake system of the type including a dual brake master cylinder having a wirst and a second independent output port ($P_1$ and $P_2$), a first and a second hydraulic fluid line ($L_1$ and $L_2$) extending from said respective first and second output ports, a pair of right and left front wheel brakes ($B_f'$ and $B_f$) having fluid chambers suitably connected with said first and second fluid lines, and a pair of right and left rear wheel brakes ($B_r'$ and $B_r$) having fluid chambers connected respectively with said first and second fluid lines, a fluid pressure control device with a failure alarm, comprising a common casing (3) arranged on said first and second fluid lines ($L_1$ and $L_2$) between said brake master cylinder and said rear wheel brakes ($B_r'$ and $B_r$) and defining a cylinder bore (4), a first and a second pressure-receiving piston ($5_1$ and $5_2$) slidably fitted in said cylinder bore at the opposite ends thereof, a first and a second fluid chamber ($7_1$ and $7_2$) defined on the outside of said respective pressure-receiving pistons and respectively communicating at all times with the upstream side of said first and second fluid lines ($L_1$ and $L_2$), a balance piston (9) slidably fitted in the mid-portion of said cylinder bore (4) so as to be normally held in a neutral position under the effect of said first and second pressure-receiving pistons ($5_1$ and $5_2$), a third and a fourth fluid chamber ($7_3$ and $7_4$) defined between the opposite ends of said balance piston (9) and said first and second pressure-receiving pistons ($5_1$ and $5_2$) and respectively communicating at all times with the downstream side of said first and second fluid lines ($L_1$ and $L_2$), bypass holes ($12_1$ and $12_2$) extending through said respective first and second pressure-receiving pistons ($5_1$ and $5_2$) for fluid communication between said first and third fluid chambers ($7_1$ and $7_3$) and between said second and fourthe fluid chambers ($7_2$ and $7_4$), respectively, plug formations ($11_1$ and $11_2$) on the opposite end faces of said balance piston (9) slidably fitted in said respective bypass holes ($12_1$ and $12_2$) so that either of said bypass holes is opened with sliding movement of said balance piston (9) in a direction opposite to the bypass hole to an extreme position, a first and a second control valve ($20_1$ and $20_2$) respectively arranged between said first and third fluid chambers ($7_1$ and $7_3$) and between said second and fourth fluid chambers ($_2$ and $7_4$) to allow fluid flow from said first and second fluid chambers, respectively, into said third and fourth fluid chambers while effecting a reduction in pressure at a predetermined ratio, and switch means arranged on said casing (3) and operable in response to sliding movement of said balance piston (9) in either direction from the neutral position thereof to actuate an external alarm (16).

* * * * *